(12) United States Patent
Saitou

(10) Patent No.: US 8,960,923 B2
(45) Date of Patent: Feb. 24, 2015

(54) PROJECTION TYPE DISPLAY DEVICE AND METHOD INCLUDING VIBRATION OF COMPONENT OF ILLUMINATION OPTICAL SYSTEM

(75) Inventor: Hiroyuki Saitou, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 290 days.

(21) Appl. No.: 13/395,867

(22) PCT Filed: Sep. 16, 2009

(86) PCT No.: PCT/JP2009/066157
§ 371 (c)(1),
(2), (4) Date: Mar. 13, 2012

(87) PCT Pub. No.: WO2011/033622
PCT Pub. Date: Mar. 24, 2011

(65) Prior Publication Data
US 2012/0170005 A1  Jul. 5, 2012

(51) Int. Cl.
*G03B 21/14* (2006.01)
*G03B 21/20* (2006.01)

(52) U.S. Cl.
CPC .............. *G03B 21/14* (2013.01); *G03B 21/206* (2013.01)
USPC ........................................................... 353/69

(58) Field of Classification Search
CPC ....... G03B 21/14; G03B 21/147; H04N 9/315
USPC ........................................................... 353/69
See application file for complete search history.

(56) References Cited

U.S. PATENT DOCUMENTS

| 7,950,808 B2 | 5/2011 | Kojima et al. |
| 2006/0187417 A1 | 8/2006 | Akiyama et al. |
| 2007/0263179 A1 | 11/2007 | Katsuragawa et al. |

FOREIGN PATENT DOCUMENTS

| CN | 101010629 A | | 8/2007 |
| JP | 2002-250970 A | | 9/2002 |
| JP | 2003-186112 A | | 7/2003 |
| JP | 2003186112 A | * | 7/2003 |
| JP | 2004-252112 A | | 9/2004 |
| JP | 2006-126394 A | | 5/2006 |

(Continued)

OTHER PUBLICATIONS

International Search Report in PCT/JP2009/066157 dated Oct. 13, 2009 (English Translation Thereof).

(Continued)

*Primary Examiner* — Thanh Luu
*Assistant Examiner* — Renee D Chavez
(74) *Attorney, Agent, or Firm* — McGinn IP Law Group, PLLC

(57) ABSTRACT

A projection type display device includes: optical modulation elements, an illumination optical system that includes light sources for emitting light from light emitting units, and condensing optical systems; and vibrator. The optical modulation elements have optical modulation surfaces for modulating incident light based on image information. The condensing optical systems condense the light from the light sources to form images on the optical modulation surfaces. A vibrator vibrates components of the illumination optical system to move areas on the optical modulation surfaces that are irradiated with the light away from the illumination optical system.

11 Claims, 10 Drawing Sheets

(56) References Cited

FOREIGN PATENT DOCUMENTS

| JP | 2006126394 A | * | 5/2006 |
| JP | 2006-259713 A | | 9/2006 |
| JP | 2008-009180 A | | 1/2008 |
| JP | 2008-250024 A | | 10/2008 |
| JP | 2008-268271 A | | 11/2008 |
| JP | 2009-003091 A | | 1/2009 |
| WO | WO00/38004 | | 6/2000 |

OTHER PUBLICATIONS

Chinese Office Action dated Dec. 13, 2013 with English translation.

* cited by examiner

Angle from normal line to light emitting surface

PROJECTION TYPE DISPLAY DEVICE AND METHOD INCLUDING VIBRATION OF COMPONENT OF ILLUMINATION OPTICAL SYSTEM

TECHNICAL FIELD

The present invention relates to a projection type display device that includes a light source and an optical modulator configured to modulate incident light based on image information.

BACKGROUND ART

As an example of a projection type display device such as a projector, there is a device that includes a light source and an optical modulator configured to modulate light from the light source based on image information. The light modulated by the optical modulator is projected as an image through a projection lens to a screen or the like.

In many cases, such a projection type display device includes a lens array for making uniform the illuminance distribution of light emitted from a light source to suppress uneven luminance of light projected to the screen.

However, in order to provide a device having a simple configuration, JP2006-126394A (Patent Literature 1) discloses a display device that includes no lens array.

The display device described in Patent Literature 1 includes an optical modulator that modulates illumination light incident on an active region, a light emitting device that has a light emitting unit roughly similar in profile to the active region of the optical modulator, and a critical illumination system that causes a luminous flux to enter from the light emitting device as illumination light to the active region of the optical modulator.

The critical illumination system forms an image of the light emitting unit of the light emitting device on the active region of the optical modulator. In other words, the light emitting unit and the active region of the optical modulator are in a conjugate relationship with each other.

CITATION LIST

Patent Literature

Patent Literature 1: JP2006-26394A

SUMMARY

Technical Problem

In the display device described in Patent Literature 1, the image of the light emitting unit of the light emitting device is formed on the active region of the optical modulator. Thus, for example, when the light demitting device has a defect such as a very small flaw, an image of the defect is formed on the active region of the optical modulator. This image of the defect is transferred to the image projected to the screen or the like, consequently deteriorating image quality.

Therefore, there is a desire to prevent deterioration of image quality even when the light source has a defect.

Solution to Problem

It is an object of the present invention to provide a projection type display device that can solve the abovementioned problem.

According to an aspect of the present invention, a projection type display device includes an optical modulation element, an illumination optical system, and a vibrator. The optical modulation element has an optical modulation surface for modulating incident light based on image information. The illumination optical system includes a light source for emitting light from a light emitting unit, and condensing optical system that condenses the light from the light source to form image on the optical modulation surface. The vibrator vibrates component of the illumination optical system to move area on the optical modulation surface irradiated with light from the illumination optical system.

This configuration enables preventing deterioration of the projected image quality even when the light source has a defect.

The above, other objects, features and advantages of the present invention will become apparent from the following description taken in conjunction with the accompanying drawings illustrating the present invention.

DESCRIPTION OF EMBODIMENTS

Embodiments of the present invention are described in detail.

Figure 1:
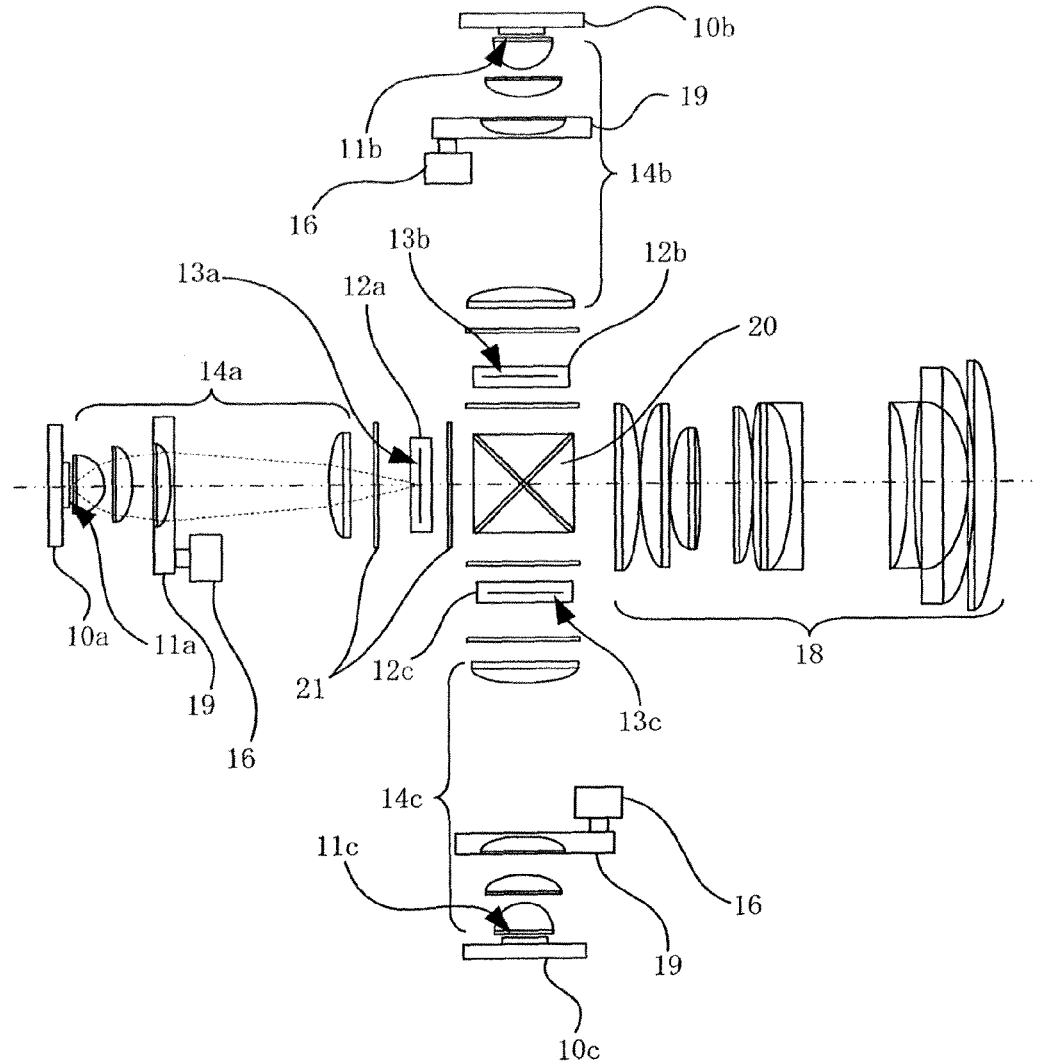
FIG. 1 is a schematic view showing a configuration of a projection type display device according to a first embodiment of the present invention.

FIG. 1 schematically shows a configuration of a projection type display device according to a first embodiment. The projection type display device includes optical modulation elements 13a, 13b, and 13c that modulate incident light based on image information, an illumination optical system, vibrator 16, and projection lens 18.

The illumination optical system includes light sources 10a, 10b, and 10c for emitting light from light emitting units 11a, 11b, and 11c, and condensing optical systems 14a, 14b, and 14c that condense light from the light sources to form images on optical modulation surfaces 13a, 13b, and 13c.

In the first embodiment, transmissive liquid crystal panels 12a, 12b, and 12c are used as optical modulation elements.

The projection type display device of this embodiment includes the three light sources, the three liquid crystal panels, and the three condensing optical systems. First light source 10a emits green light. Second light source 10b emits red light, and third light source 10c emits blue light.

Polarizing plates 21 are located on both sides of each of liquid crystal panels 12a, 12b, and 12c. First liquid crystal panel 12a changes the polarized state of the light emitted from first light source 10a for each pixel. Similarly, second liquid crystal panel 12b changes the polarized state of the light emitted from second light source 10b for each pixel, and third liquid crystal panel 12c changes the polarized state of the light emitted from third light source 10c for each pixel. Operations of liquid crystal panels 12a, 12b, and 12c and polarizing plates 21 enable projection of the lights of the respective colors as images.

The lights emitted from light sources 10a, 10b, and 10c are respectively entered through liquid crystal panels 12a, 12b, and 12c into cross dichroic prism 20. The lights from light sources 10a, 10b, and 10c are synthesized at cross dichroic prism 20, and then projected through projection lens 18 to a screen or the like outside the device. A full-color image is accordingly projected onto a target body such as the screen or the like.

First condensing optical system 14a causes light emitting unit 11a of first light source 10a to form an image on optical modulation surface 13a of first liquid crystal panel 12a. Similarly, second condensing optical system 14b causes light emitting unit 11b of second light source 10b to form an image on optical modulation surface 13b of second liquid crystal panel 12b, and third condensing optical system 14c causes light emitting unit 11c of third light source 10c to form an image on optical modulation surface 13c of third liquid crystal panel 12c.

Thus, light emitting units 11a, 11b, and 11c of the light sources and corresponding optical modulation surfaces 13a, 13b, and 13c are in conjugate relationship with condensing optical systems 14a, 14b, and 14c.

In this embodiment, each of condensing optical systems 14a, 14b, and 14c includes a plurality of optical elements such as lenses. Alternatively, each of condensing optical systems 14a, 14b, and 14c can include one optical element.

Vibrator 16 vibrates components of the illumination optical system including the light sources and the condensing optical systems, and moves areas on optical modulation surfaces 13a, 13b, and 13c (illumination areas) that are irradiated with light away from the illumination optical system.

In this embodiment, vibrator 16 vibrates at least one of the optical elements constituting condensing optical systems 14a, 14b, and 14c. Its vibration direction is desirably within a plane vertical to an optical axis. Vibrator 16, which can directly vibrate the optical element, can also vibrate holder 19 for holding the optical element.

On the plane that includes optical modulation surfaces 13a, 13b, and 13c, because of vibration of the illumination area, even when light sources 10a, 10b, and 10c have defects such as flaws, images of the defects vibrate in the image projected to the screen. Accordingly, it becomes difficult for a user to recognize images of the defects, or the user cannot recognize the defects at all. As a result, deterioration of image quality is substantially prevented.

No vibration occurs on optical paths from optical modulation paths 13a, 13b, and 13c to projection lens 18. Thus, the image projected onto the screen itself does not vibrate.

Figure 2:
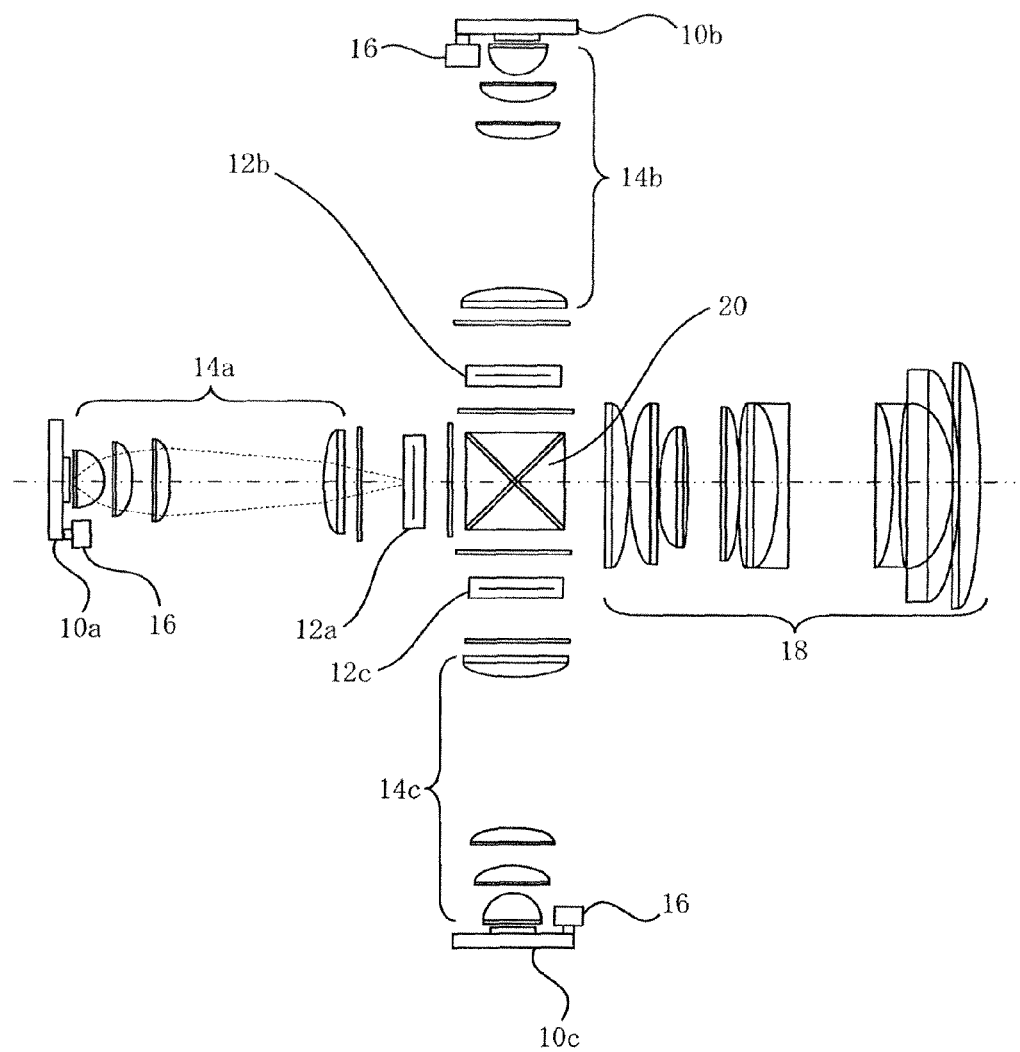
FIG. 2 is a schematic view showing a configuration of a projection type display device according to a modified example of the first embodiment shown in FIG. 1.

FIG. 2 schematically shows a configuration of a projection type display device according to a modified example of the first embodiment. Vibrator 16 vibrates not condensing optical systems 14a, 14b, and 14c but light sources 10a, 10b, and 10c. Its vibration direction is desirably within a plane vertical to an optical axis.

Other components are similar to those shown in FIG. 1, and thus description thereof is omitted. In this modified example, even when light sources 10a, 10b, and 10c have defects such as flaws, deterioration of the quality of an image projected to a screen can be prevented.

The vibrator that vibrates condensing optical systems 14a, 14b, and 14c or light sources 10a, 10b, and 10c can employ any configuration. As an example, the vibrator can include a motor and an eccentric cam. The motor rotates the eccentric cam. Because its center of gravity is shifted from the axis of rotation, the eccentric cam can change the rotational motion of the motor to vibration motion.

The number of vibrations of vibrator 16 is preferable set to a quantity in which it becomes difficult for a user to recognize image of the defects, such as flaws, or the user cannot recognize them at all. As an example, the number of vibrations of the vibrator can be approximately equal to a synchronous frequency (60 hertz) of an image signal.

Light emitting units 11a, 11b, and 11c of light sources 10a, 10b, and 10c are preferably formed into planar shapes similar to those of optical modulation surfaces 13a, 13b, and 13c of the liquid crystal panels. The shapes of optical modulation surfaces 13a, 13b, and 13c of the liquid crystal panels and shapes of illumination areas on optical modulation surfaces 13a, 13b, and 13c accordingly become similar, enabling irradiation of optical modulation surfaces 13a, 13b, and 13c with most of the light emitted from light sources 10a, 10b, and 10c. For example, a light emitting diode is used as such a light source.

In this embodiment, for example, light emitting units 11, 11b, and 11c of the light sources and optical modulation surfaces 13a, 13b, and 13c of the optical modulation elements are formed rectangular where aspect ratios are 3:4 or 9:16.

Figure 3:
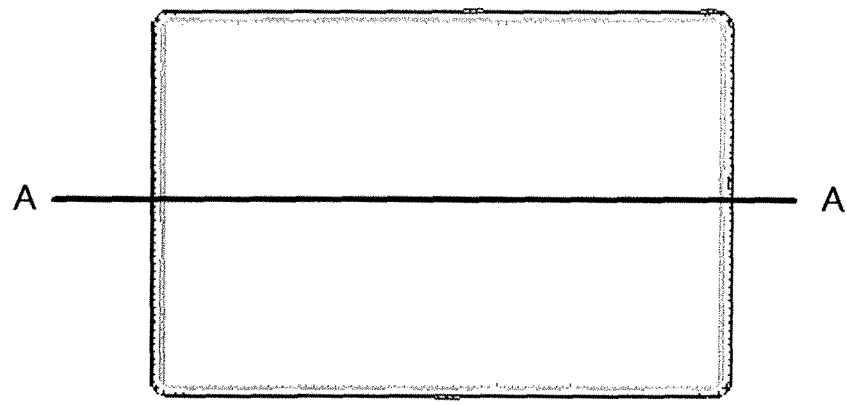
FIG. 3 is a schematic view showing light illuminance distribution on the light emitting unit of a light source.
Figure 4:
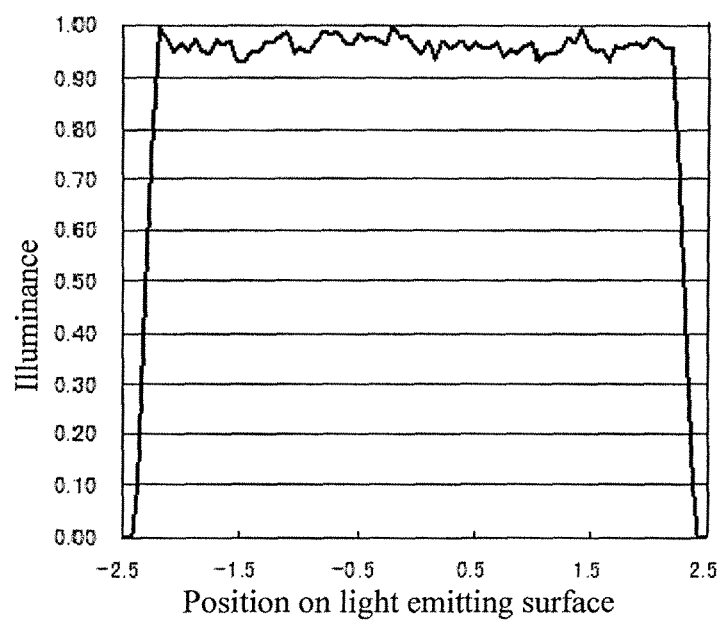
FIG. 4 is a graph showing light illuminance on line A-A shown in FIG. 3.

FIGS. 3 and 4 show illuminance of light emitted from lights sources 10a, 10b, and 10c on planar light emitting unit 11 (light emitting surface). In FIG. 3, the sizes of illuminance of light on the light emitting surface are indicated by different patterns. FIG. 4 is a graph showing illuminance on the line A-A shown in FIG. 2. The horizontal axis in FIG. 4 indicates positions on the light emitting surface with the center of the light emitting surface set as the origin. In this embodiment, for example, the width of the light emitting surface is 5 millimeters.

As shown in FIGS. 3 and 4, light sources 10a, 10b, and 10c preferably emit light having substantially uniform illuminance distributions on the light emitting surface. This enables suppression of uneven illuminance of images projected to the screen.

Figure 5:
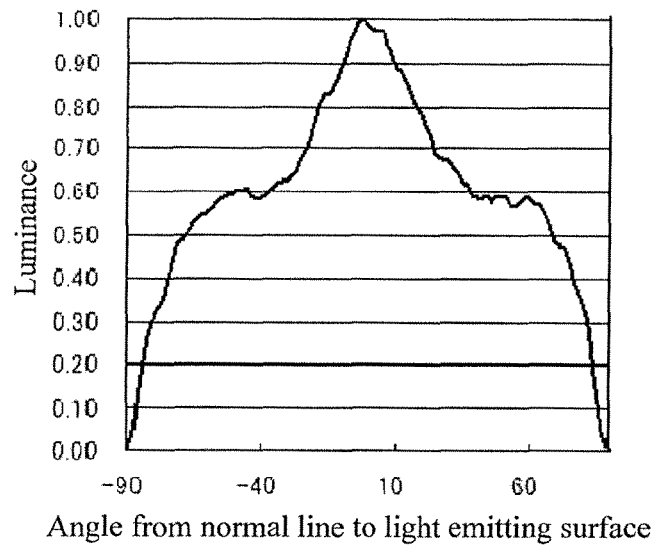
FIG. 5 is a graph showing an angle distribution of light emitted from the light emitting unit of the light source.

FIG. 5 is a graph showing the relationship between luminance of light from light sources 10a, 10b, and 10c and an exit angle. As shown in FIG. 5, luminance of light emitted from light sources 10a, 10b, and 10c is preferably set large when the exit angle (angle from normal direction of light emitting unit) is small, and gradually smaller as the exit angle is larger. This enables transmission of light as much as possible through the projection lens. As a result, illuminance of the image projected to the screen is improved.

Figure 6:
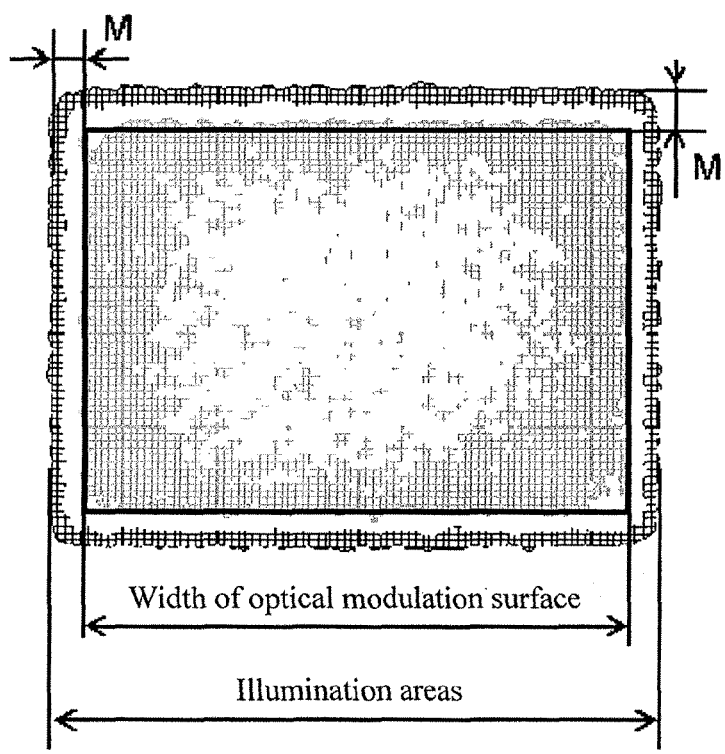
FIG. 6 is a schematic view showing an optical modulation surface of a liquid crystal panel and the illumination area of the light from the light source, which is applied to the optical modulation surface.

FIG. 6 schematically shows optical modulation surfaces 13a, 13b, and 13c of the liquid crystal panels and illumination areas on optical modulation surfaces 13a, 13b, and 13c. The illumination areas are vibrated at least by vibrator 16. In vibration directions, the illumination areas are a size larger than optical modulation surfaces 13a, 13b, and 13c of the liquid crystal panels. In FIG. 6, the illumination areas are larger than the edges of optical modulation surfaces 13a, 13b, and 13c by a 2M length.

When the illumination areas on the optical modulation surfaces vibrate, vibration amplitude of vibrator 16 is restricted so that a state is maintained in which all optical modulation surfaces 13a, 13b, and 13c of the liquid crystal panels are always covered with the illumination areas.

The vibration direction of the vibrator that vibrates condensing optical systems 14a, 14b and 14c or light sources 10a, 10b, and 10c can arbitrarily be set. The vibrator can vibrate such components with different numbers of vibrations in a longitudinal direction and a horizontal direction.

Next, other advantages of the projection type display device according to this embodiment are described by comparing it with a projection type display device including a lens array according to Comparative Example.

Figure 7:
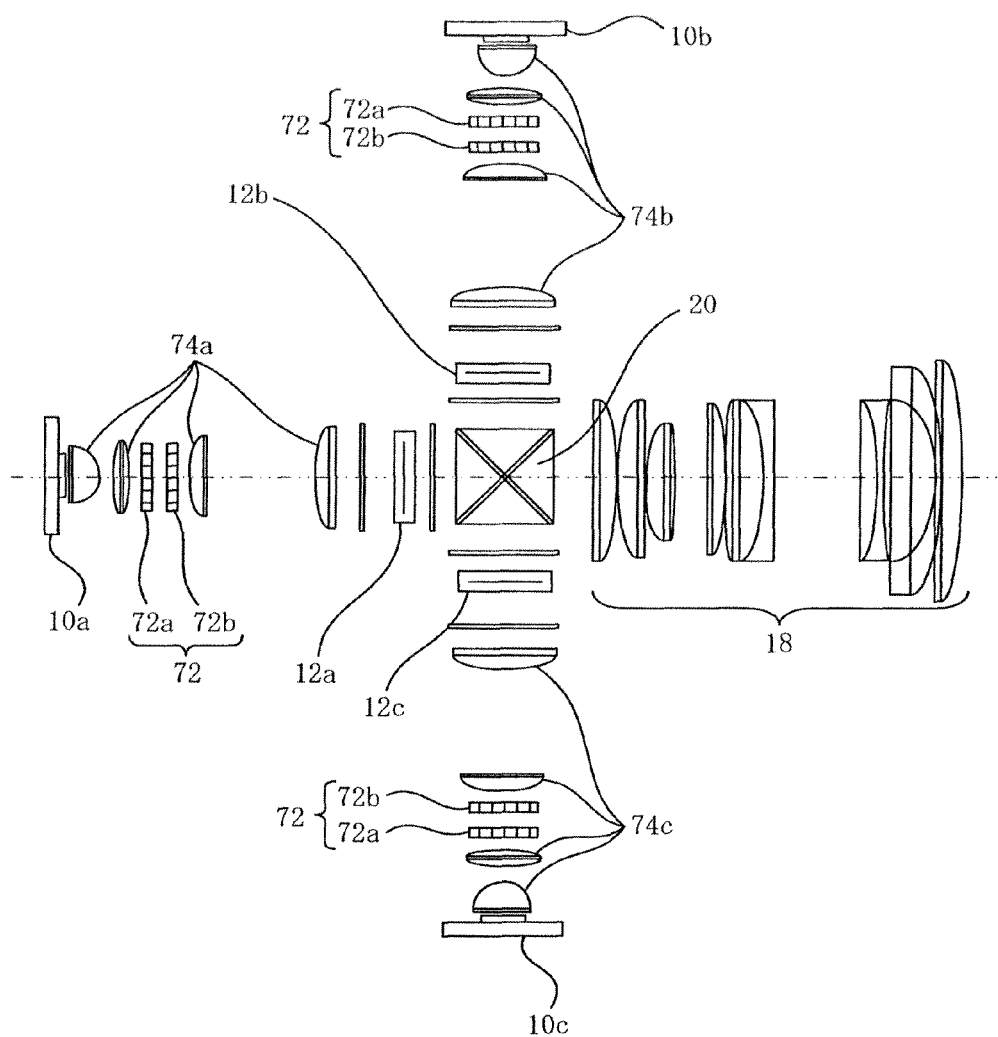
FIG. 7 is a schematic view showing a configuration of a projection type display device according to Comparative Example.

FIG. 7 schematically shows a configuration of the projection type display device according to the Comparative Example. The projection type display device according to the Comparative Example includes components almost similar to those of the projection type display device of this embodiment. However, first and second lens arrays 72a and 72b are located between light sources 10a, 10b, and 10c and optical modulation elements 12a, 12b, and 12c.

Light sources 10a, 10b, and 10c, lens arrays 72a and 72b, condensing optical systems 74a, 74b, and 74c, and optical modulation elements 12a, 12b, and 12c are configured based on the Kohler illumination system. Specifically, different from the first embodiment, condensing optical systems 74a, 74b, and 74c do not cause light emitting units of light sources 10a, 10b, and 10c to form any images on the optical modulation surfaces of optical modulation elements 12a, 12b, and 12c.

Other components are similar to those of the abovementioned embodiment, and light sources 10a, 10b, and 10c have characteristics shown in FIGS. 3 to 5.

Figure 8:
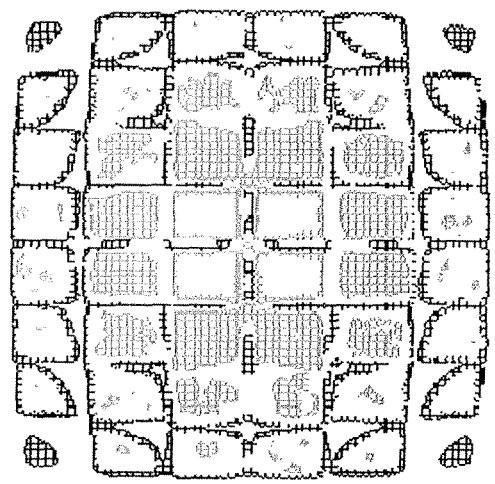
FIG. 8 is a schematic view showing an illuminance distribution of light on a second lens array according to the Comparative Example.
Figure 9:
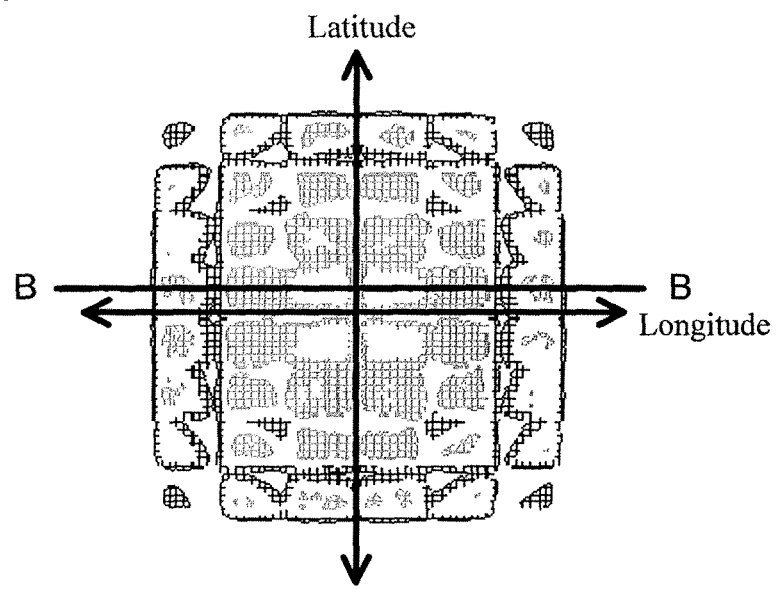
FIG. 9 is a schematic view showing an exit angle distribution of light output from an optical modulation surface according to the Comparative Example.
Figure 10:
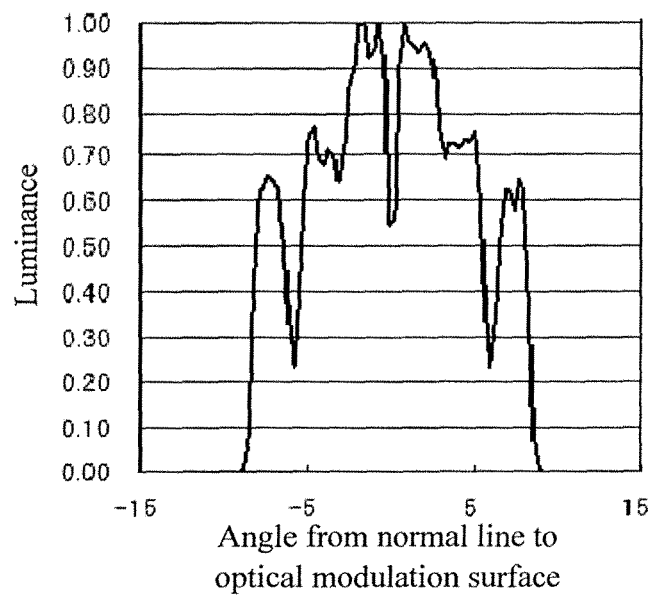
FIG. 10 is a graph showing light luminance on line B-B shown in FIG. 9.

FIG. 8 shows an illuminance distribution of light on second lens array 72b according to the Comparative Example. FIG. 9 shows an exit angle distribution of light output from liquid crystal panels 12a, 12b, and 12c according to the Comparative Example. In FIG. 9, the point of intersection between the vertical axis and horizontal axis indicates a normal direction of the optical modulation surface. The vertical axis and the horizontal axis respectively indicate a latitude and a longitude based on the normal direction. In FIGS. 8 and 9, the sizes of light illuminance or luminance are indicated by different patterns. FIG. 10 shows luminance of light on line B-B shown in FIG. 9.

In the Comparative Example, the components are configured based on the Kohler illumination system, and hence there is a relationship of Fourier transformation between light intensity distribution on the second lens array and light intensity distribution on the optical modulation surface. As a result, the exit angle distribution of light output from the optical modulation surface is approximately similar to the illuminance distribution of light on second lens array 72b.

Referring to FIG. 10, luminance basically declines with an increase in the angle. For example, when an angle is about 8 degrees, luminance increases again to a maximum value. In this Example, in a direction tilted by 8 degrees from the normal of a light illumination surface, luminance is about 60% of a luminance peak (luminance in normal direction of optical modulation surface).

Light that is greatly shifted from the normal direction of the optical modulation surface and that exceeds an angle that enables projection lens 18 to capture light cannot be transmitted through the projection lens. Consequently, when intensity of the light shifted from the normal direction of the optical modulation surface is large, illuminance on the screen drops.

Next, the projection type display device according to the first embodiment is described. It is presumed that light sources 10a, 10b, and 10c have characteristics shown in FIGS. 3 to 5.

Figure 11:
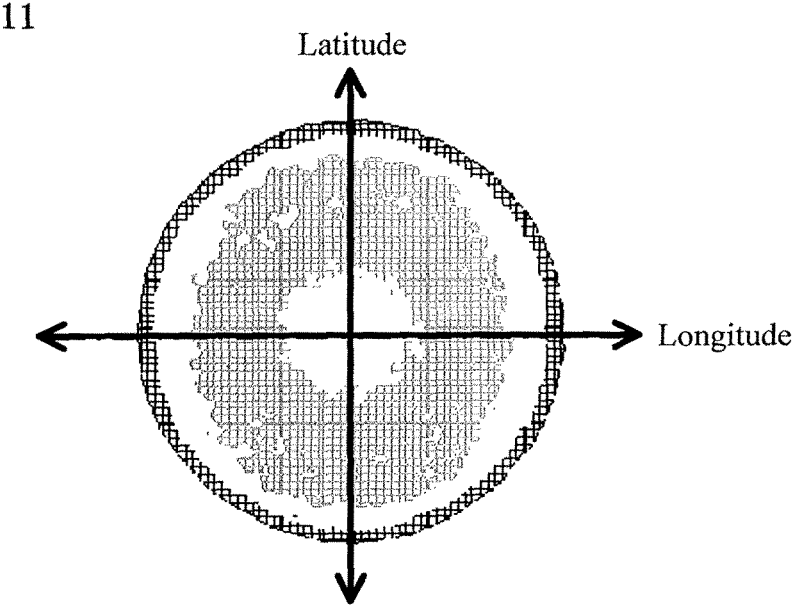
FIG. 11 is a schematic view showing an exit angle distribution of light output from the optical modulation surface in the projection type display device shown in FIG. 1.
Figure 12:
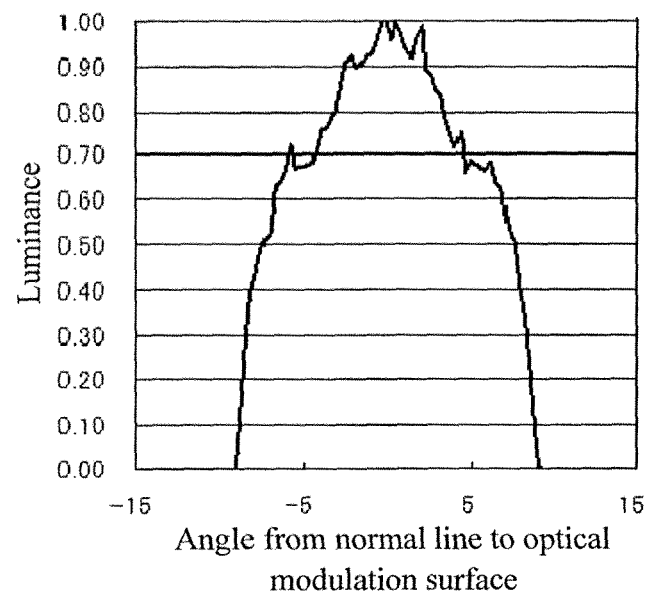
FIG. 12 is a graph showing light luminance along the longitudinal axis shown in FIG. 11.

FIG. 11 shows the angle distribution of light output from optical modulation surfaces 13a, 13b, and 13c of the liquid crystal panels according to this embodiment. In FIG. 11, as in the case shown in FIG. 9, the vertical axis and horizontal axis respectively show latitude and longitude based on the normal direction. FIG. 12 shows luminance of light on the longitudinal axis shown in FIG. 11.

Referring to FIG. 12, in the first embodiment, luminance of the light output from the optical modulation surface declines with an increase in the angle from the normal direction of the optical modulation surface.

Figure 13:
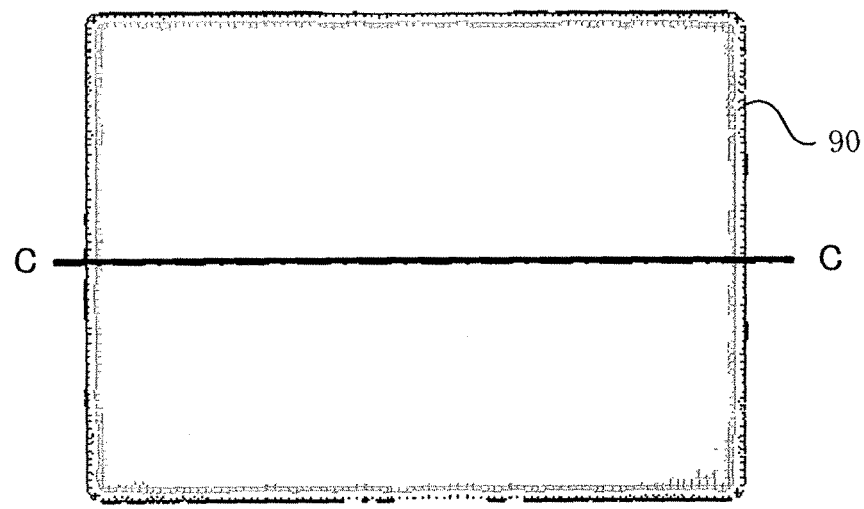
FIG. 13 is a schematic view showing illuminance distribution of light projected to a screen according to the Comparative Example.
Figure 14:
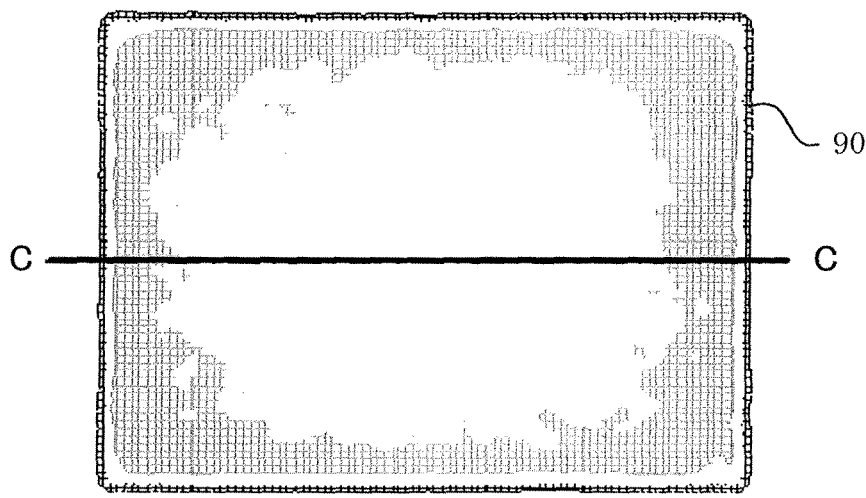
FIG. 14 is a schematic view showing an illuminance distribution of light projected to a screen in the projection type display device shown in FIG. 1.
Figure 15:
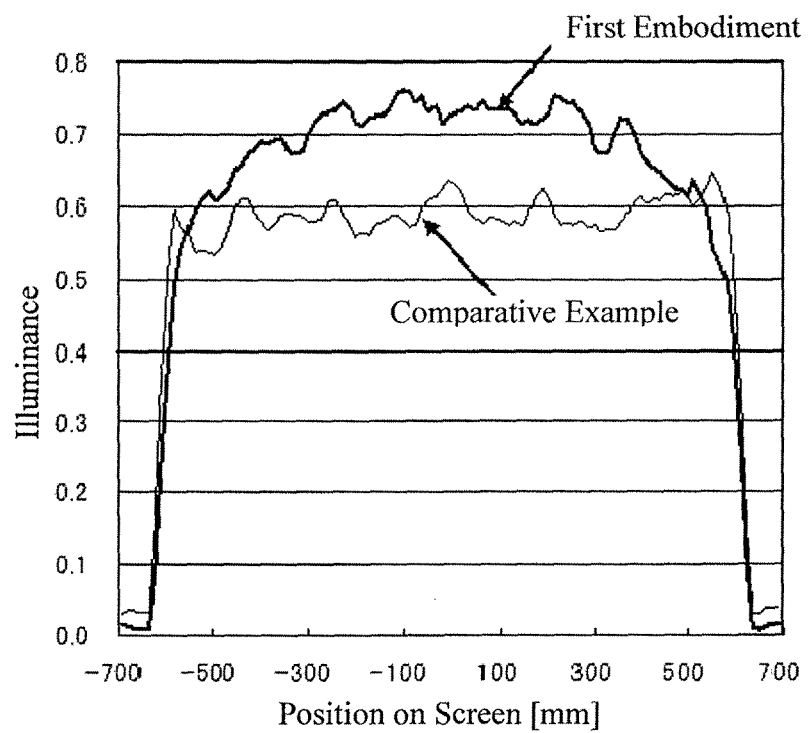
FIG. 15 is a graph showing light luminance on line C-C shown in FIGS. 13 and 14.

FIG. 13 schematically shows the illuminance distribution of light projected onto screen 90 according to the Comparative Example. FIG. 14 schematically shows the illuminance distribution of light projected onto screen 90 according to this embodiment. In FIGS. 13 and 14, sizes of illuminance of light on the light emitting units of the light sources are indicated by different patterns. FIG. 15 is a graph showing illuminance of light on C-C lines of FIGS. 13 and 14.

As can be understood from FIG. 15, as compared with the Comparative Example, the projection type display device according to this embodiment has an advantage of improving the illuminance of the light projected onto screen 90. This can be attributed to the following: as shown in FIG. 2, in this embodiment, as angles from the normal directions of optical modulation surfaces 13a, 13b, and 13c are larger, light luminance declines more quickly, enabling transmission of more light through projection lens 18.

Figure 16:
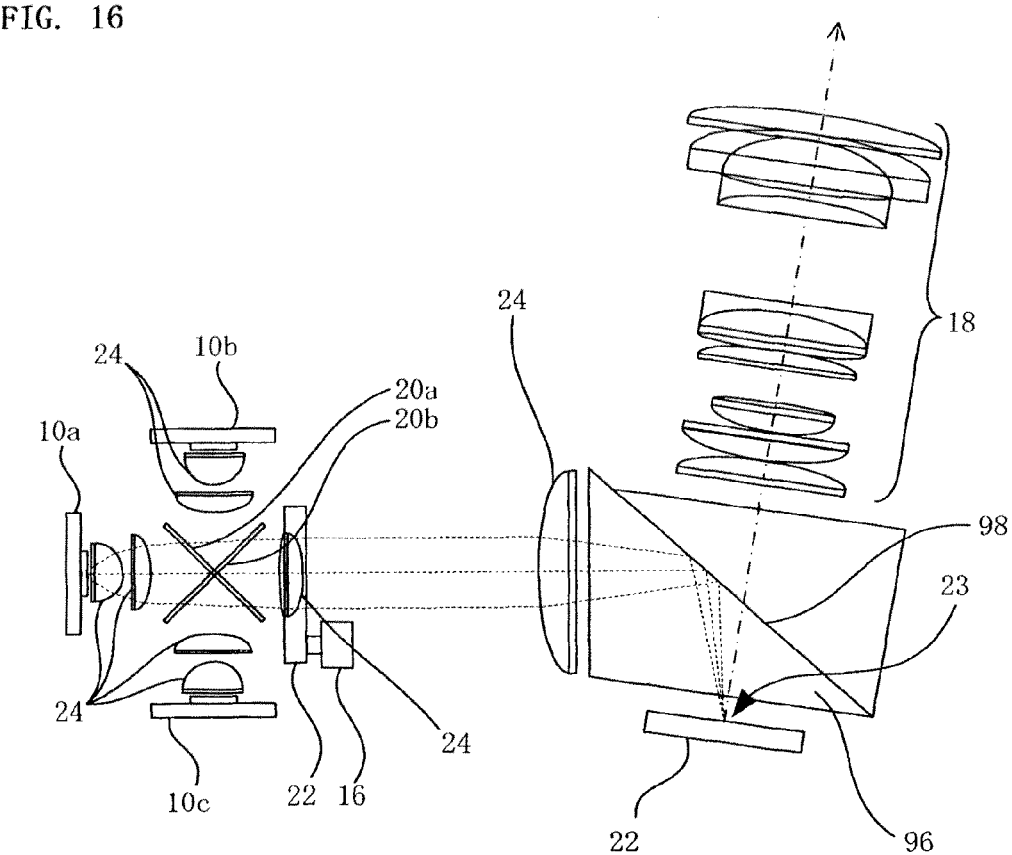
FIG. 16 is a schematic view showing a configuration of a projection type display device according to a second embodiment of the present invention.

Next, referring to FIG. 16, a projection type display device according to a second embodiment is described. The projection type display device according to the second embodiment is a single-plate projection display device that uses digital micromirror device (DMD) 22 as an optical modulation element.

In the second embodiment, as in the case of the first embodiment, the projection type display device includes DMD 22 that has optical modulation surface 23 for modulating incident light based on image information, an illumination optical system that includes light sources 10a, 10b, and 10c and a condensing optical system, vibrator 16, and projection lens 18.

For light sources 10a, 10b, and 10c, light sources similar to those of the first embodiment are used. Light emitting surfaces 11a, 11b, and 11c of light sources 10a, 10b, and 10c are preferably formed into planar shapes similar to that of optical modulation surface 23 of DMD 22.

DMD 22 can scan the reflecting direction of light from light sources 10a, 10b, and 10c for each pixel. DMD 22 controls whether to reflect the light toward projection lens 18 for each pixel based on image information.

Dichroic mirrors 20a and 20b, which synthesize the light from light sources 10a, 10b, and 10c, are located between light source 10 and DMD 22 on the optical path of light. The light synthesized by dichroic mirrors 20a and 20b is entered through total internal reflection (TIR) prism 96 into optical modulation surface 23 of the DMD.

The light incident on TIR prism 96 is totally reflected on air gap surface 98 to exit toward DMD 22. The light output from DMD 22 toward projection lens 18 is transmitted through TIR prism 96 to be projected through projection lens 18 to the outside of the device.

The condensing optical system including a plurality of optical elements 24 causes light emitting units 11a, 11b, and 11c of the light sources to form images on optical modulation surface 23 of DMD 22. When possible, the condensing optical system can include one optical element such as a lens.

In this embodiment, lenses 24 constituting the condensing optical system are held in holder 19. Vibrator 16 vibrates at least one of lenses 24 constituting the condensing optical system by vibrating holder 19. As in the case of the first embodiment, vibrator 16 can vibrate light sources 10a, 10b, and 10c.

In the embodiment shown in FIG. 16, the plurality of optical elements 24 constituting the condensing optical system are located on an optical path before synthesizing of the light from the light sources and on an optical path after the synthesizing. Therefore, vibrator 16 may be located after the synthesizing of the light from the light sources, namely, after dichroic mirrors 20a and 20b. In this case, even when all light sources 10a, 10b, and 10c have defects, the vibration of only one optical element can cause difficulty in recognizing images of the defects.

According to this embodiments, light from the plurality of light sources 10a, 10b, and 10c is synthesized by cross dichroic mirror 20 or dichroic mirrors 20a and 20b. However, another arbitrary known means for synthesizing light from the plurality of light sources can be used. The necessary number of light sources included in the projection type display device is at least one.

The preferred embodiments of the present invention have been described in detail. However, the present invention is not limited to the embodiments. Various changes and modifications can be made without departing from the spirit and the scope of the invention.

REFERENCE SIGNS LIST 10a, 10b, 10c light source
11a, 11b, 11c light emitting unit
12a, 12b, 12c liquid crystal panel
13a, 13b, 13c optical modulation surface
14a, 14b, 14c condensing optical system
16 vibrator
18 projection lens
19 holder
20 cross dichroic prism
20a first dichroic mirror
20b second dichroic mirror
21 polarizing plate
22 DMD
23 optical modulation surface
24 optical element
90 screen
96 TIR prism
98 air gap surface

The invention claimed is:

1. A projection type display device comprising:
an optical modulation element that comprises an optical modulation surface for modulating an incident light based on image information;
a light source for emitting a light from a light emitting unit;
an illumination optical system that includes a condensing optical system configured to condense the light from the light source to form an image on the optical modulation surface; and
a vibrator that vibrates a component of the illumination optical system to move an illumination area on the optical modulation surface irradiated with the light emitted from the illumination optical system,
wherein:
a luminance of the light emitted from the light source decreases as an angle from a normal line to a light emitting surface of the light source increases,
the illumination area is greater than the optical modulation surface,
the condensing optical system includes at least one optical element, and
the vibrator vibrates the at least one optical element.

2. The projection type display device according to claim 1, wherein the vibrator vibrates the light source.

3. The projection type display device according to claim 2, wherein:
the light emitting unit has a planar shape similar to that of the optical modulation surface; and
the light source emits light substantially uniform in an illuminance distribution.

4. The projection type display device according to claim 1, wherein:
the light emitting unit has a planar shape similar to that of the optical modulation surface; and
the light source emits light substantially uniform in an illuminance distribution.

5. The projection type display device according to claim 1, wherein
the light source emits light substantially uniform in an illuminance distribution.

6. The projection type display device according to claim 1, wherein during said vibrating, a vibration amplitude of said vibrator is restricted so that said optical modulation surface is continuously covered with said illumination area.

7. The projection type display device according to claim 1, wherein said optical modulation element comprises a digital micromirror device (DMD).

8. A method for operating a projection type display device, the projection type display device comprising:
an optical modulation element that comprises an optical modulation surface for modulating an incident light based on image information;
a light source for emitting a light from a light emitting unit;
an illumination optical system that includes a condensing optical system configured to condense the light from the light source to form an image on the optical modulation surface, the condensing optical system including at least one optical element; and
a vibrator that vibrates the at least one optical element,
wherein said method comprises:
emitting a light from the light source so that an illumination area on the optical modulation surface irradiated with the light emitted from the illumination optical system is greater than the optical modulation surface, and a luminance of the light decreases as an angle from a normal line to a light emitting surface of the light source increases; and vibrating the at least one optical element to move the illumination area.

9. A projection type display device comprising:

an optical modulation element that comprises an optical modulation surface for modulating an incident light based on image information;

a light source for emitting a light from a light emitting unit;

an illumination optical system that includes a condensing optical system configured to condense the light from the light source to form an image on the optical modulation surface; and a vibrator that vibrates a component of the illumination optical system to move an illumination area on the optical modulation surface irradiated with the light emitted from the illumination optical system, wherein:
a luminance of the light emitted from the light source decreases as an angle from a normal line to a light emitting surface of the light source increases, the illumination area is greater than the optical modulation surface, and the vibrator vibrates the component so that a number of vibrations is approximately equal to a synchronous frequency of an image signal.

10. A projection type display device comprising:

an optical modulation element that comprises an optical modulation surface for modulating incident light based on image information;

a light source;

an illumination optical system that includes a condensing optical system configured to condense light from the light source to form an image on the optical modulation surface; and a vibrator that vibrates a component of the illumination optical system to move an illumination area on the optical modulation surface irradiated with light emitted from the illumination optical system, wherein the illumination area is greater than the optical modulation surface, and wherein a length of the optical modulation surface in a longitudinal direction is different from a length of the optical modulation surface in a horizontal direction.

11. A projection type display device comprising:

an optical modulation element that comprises an optical modulation surface for modulating incident light based on image information;

a light source;

an illumination optical system that includes a condensing optical system configured to condense light from the light source to form an image on the optical modulation surface; and a vibrator that vibrates a component of the illumination optical system to move an illumination area on the optical modulation surface irradiated with light emitted from the illumination optical system, wherein the illumination area is greater than the optical modulation surface, and wherein the vibrator vibrates the component so that a number of vibrations of the illumination area in a longitudinal direction is different from a number of vibrations of the illumination area in a horizontal direction.

* * * * *